(12) United States Patent
You et al.

(10) Patent No.: US 11,695,814 B2
(45) Date of Patent: Jul. 4, 2023

(54) METHOD AND APPARATUS FOR STREAM DESCRIPTOR BINDING IN A STREAMING ENVIRONMENT

(71) Applicant: Nokia Technologies Oy, Espoo (FI)

(72) Inventors: Yu You, Kangasala (FI); Wolfgang Van Raemdonck, Antwerp (BE)

(73) Assignee: NOKIA TECHNOLOGIES OY, Espoo (FI)

( * ) Notice: Subject to any disclaimer, the term of this patent is extended or adjusted under 35 U.S.C. 154(b) by 66 days.

(21) Appl. No.: 17/273,276

(22) PCT Filed: Sep. 4, 2019

(86) PCT No.: PCT/IB2019/057462
§ 371 (c)(1),
(2) Date: Mar. 3, 2021

(87) PCT Pub. No.: WO2020/049489
PCT Pub. Date: Mar. 12, 2020

(65) Prior Publication Data
US 2021/0329050 A1    Oct. 21, 2021

Related U.S. Application Data

(60) Provisional application No. 62/727,977, filed on Sep. 6, 2018.

(51) Int. Cl.
*H04L 65/60* (2022.01)
*H04L 67/562* (2022.01)

(52) U.S. Cl.
CPC ............ *H04L 65/60* (2013.01); *H04L 67/562* (2022.05)

(58) Field of Classification Search
CPC ..... H04L 65/60; H04L 67/2809; H04L 69/18; G06F 9/542

(Continued)

(56) References Cited

U.S. PATENT DOCUMENTS

| 7,814,470 B2 | 10/2010 | Mamou et al. |
| 2003/0236856 A1* | 12/2003 | Bird ...................... G06F 16/951 709/217 |

(Continued)

FOREIGN PATENT DOCUMENTS

WO    2020/014372 A1    1/2020

OTHER PUBLICATIONS

"3rd Generation Partnership Project;Technical Specification Group Services and System Aspects; Uplink Streaming (Release 15)", 3GPP TS 26.238, V15.1.0, Mar. 2018, pp. 1-32.

(Continued)

*Primary Examiner* — Tan Doan
(74) *Attorney, Agent, or Firm* — Alston & Bird LLP

(57) ABSTRACT

A method, apparatus and computer program product provide a stream binding mechanism that supports stream data pulling and pushing in a distributed or cloud based streaming environment. The method, apparatus and computer program product receive a stream register message associated with a stream from a streaming entity. The stream register message includes a binding descriptor. The method, apparatus and computer program product transmit a create connection message to a stream broker. The method, apparatus and computer program product transmit an endpoint message including a set of connection parameters of an endpoint to the streaming entity. The method, apparatus and computer program product receive a query for the stream from a stream processing node. And the method, apparatus and computer program product transmit a response to the query to the stream processing node. The response includes a set of connection parameters of the stream broker.

19 Claims, 6 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 2004/0078470 | A1* | 4/2004 | Baumeister | H04L 67/02 709/227 |
| 2008/0263177 | A1* | 10/2008 | Breiter | H04L 9/40 709/217 |
| 2012/0054774 | A1* | 3/2012 | Jonnagadla | G06F 9/546 719/313 |
| 2015/0026356 | A1* | 1/2015 | Kaplinger | H04L 67/55 709/230 |

OTHER PUBLICATIONS

"3rd Generation Partnership Project;Technical Specification Group Services and System Aspects;Guidelines on the Framework for Live Uplink Streaming (FLUS);(Release 15)", 3GPP TR 26.939, V15.0.0, Jun. 2018, pp. 1-29.

"High Efficiency Video Coding", Series H: Audiovisual And Multimedia Systems, Infrastructure of audiovisual services—Coding of moving video, Recommendation ITU-T H.265, Feb. 2018, 692 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 14: MP4 File Format", ISO/IEC 14496-14, First edition, Nov. 15, 2003, 18 pages.

"Text of ISO/IEC DIS 23090-8 Network-based Media Processing", ISO/IEC JTC 1/S C 29/WG 11, N18657, Systems, Jul. 12, 2019, 133 pages.

International Search Report and Written Opinion received for corresponding Patent Cooperation Treaty Application No. PCT/IB2019/057462, dated Nov. 19, 2019, 14 pages.

You et al., "Nokia Response to MPEG-1 NBMP Call for Proposal", ISO/IEC JTC1/SC29/WG11 MPEG2018 M42932 V2, Nokia Technologies, Jul. 2018, 33 pages.

* cited by examiner

METHOD AND APPARATUS FOR STREAM DESCRIPTOR BINDING IN A STREAMING ENVIRONMENT

RELATED APPLICATION

This application claims priority to PCT Application No. PCT/IB2019/057462, filed on Sep. 4, 2019, which claims priority to U.S. Provisional Application No. 62/727,977, filed on Sep. 6, 2018, each of which is incorporated herein by reference in its entirety.

TECHNICAL FIELD

An example embodiment relates generally to a data stream processing system and method.

BACKGROUND

Data streams in a distributed or cloud based streaming environment are typically unbound data flows that are infinite (without a defined length), unpredictable, and generated with different bit rates. The data streams may include structured data such as JavaScript Object Notation (JSON) and opaque media content such as video and audio data.

Stream data may be provided from various sources and may be consumed by various sinks. For one particular stream that lasts for a period of time, multiple sources and multiple sinks may dynamically provide and consume stream data. Therefore, there is a need for a stream discovery mechanism where a system responsible for processing the streams may launch new processing flows for new incoming streams and optionally combine the incoming streams before sending the stream data out to sinks.

One way of implementing a stream discovery mechanism is implementing data retrieval logic for pulling stream data from sources and/or a server interface for pushing stream data to sinks on the system responsible for processing the streams. However, such data retrieval logic and/or server interface would be dependent on the communication protocols used, making the portability of this solution fairly limited. In addition, such data retrieval logic and/or server interface would require a substantial amount of computing resources on the system responsible for processing the streams.

BRIEF SUMMARY

A method, apparatus and computer program product are provided in accordance with an example embodiment to provide a stream binding mechanism that supports stream data pulling and pushing in a distributed or cloud based streaming environment.

In one example embodiment, a method is provided that includes receiving a stream register message associated with a stream from a streaming entity. The stream register message includes a binding descriptor. The method further includes causing transmission of a create connection message to a stream broker. The method further includes causing transmission of an endpoint message including a set of connection parameters of an endpoint to the streaming entity. The method further includes receiving a query for the stream from a stream processing node. The method further includes causing transmission of a response to the query to the stream processing node. The response includes a set of connection parameters of the stream broker.

In some implementations of such a method, the streaming entity comprises a source. In some embodiments, the streaming entity comprises a sink. In some embodiments, the stream broker is configured to establish connection with the streaming entity to transmit stream data. In some embodiments, the stream broker is configured to establish connection with the streaming processing node to transmit stream data.

In another example embodiment, an apparatus is provided that includes means for receiving a stream register message associated with a stream from a streaming entity. The stream register message includes a binding descriptor. The apparatus further includes means for causing transmission of a create connection message to a stream broker. The apparatus further includes means for causing transmission of an endpoint message including a set of connection parameters of an endpoint to the streaming entity. The apparatus further includes means for receiving a query for the stream from a stream processing node. The apparatus further includes means for causing transmission of a response to the query to the stream processing node. The response includes a set of connection parameters of the stream broker.

In some implementations of such an apparatus, the streaming entity comprises a source. In some embodiments, the streaming entity comprises a sink. In some embodiments, the stream broker is configured to establish connection with the streaming entity to transmit stream data. In some embodiments, the stream broker is configured to establish connection with the streaming processing node to transmit stream data.

In another example embodiment, an apparatus is provided that includes at least one processor and at least one memory including computer program code for one or more programs with the at least one memory and the computer program code configured to, with the at least one processor, cause the apparatus at least to receive a stream register message associated with a stream from a streaming entity. The stream register message includes a binding descriptor. The computer program code is further configured to, with the at least one processor, cause the apparatus to cause transmission of a create connection message to a stream broker. The computer program code is further configured to, with the at least one processor, cause the apparatus to cause transmission of an endpoint message including a set of connection parameters of an endpoint to the streaming entity. The computer program code is further configured to, with the at least one processor, cause the apparatus to receive a query for the stream from a stream processing node. The computer program code is further configured to, with the at least one processor, cause the apparatus to cause transmission of a response to the query to the stream processing node. The response includes a set of connection parameters of the stream broker.

In some implementations of such an apparatus, the streaming entity comprises a source. In some embodiments, the streaming entity comprises a sink. In some embodiments, the stream broker is configured to establish connection with the streaming entity to transmit stream data. In some embodiments, the stream broker is configured to establish connection with the streaming processing node to transmit stream data.

In another example embodiment, a computer program product is provided that includes at least one non-transitory computer-readable storage medium having computer executable program code instructions stored therein with the computer executable program code instructions comprising program code instructions configured, upon execution, to receive a stream register message associated with a stream from a streaming entity. The stream register message includes a binding descriptor. The computer executable program code instructions comprise program code instructions that are further configured, upon execution, to cause transmission of a create connection message to a stream broker. The computer executable program code instructions comprise program code instructions that are further configured, upon execution, to cause transmission of an endpoint message including a set of connection parameters of an endpoint to the streaming entity. The computer executable program code instructions comprise program code instructions that are further configured, upon execution, to receive a query for the stream from a stream processing node. The computer executable program code instructions comprise program code instructions that are further configured, upon execution, to cause transmission of a response to the query to the stream processing node. The response includes a set of connection parameters of the stream broker.

In some implementations of such a computer program product, the streaming entity comprises a source. In some embodiments, the streaming entity comprises a sink. In some embodiments, the stream broker is configured to establish connection with the streaming entity to transmit stream data. In some embodiments, the stream broker is configured to establish connection with the streaming processing node to transmit stream data.

BRIEF DESCRIPTION OF THE DRAWINGS

Figure 1:
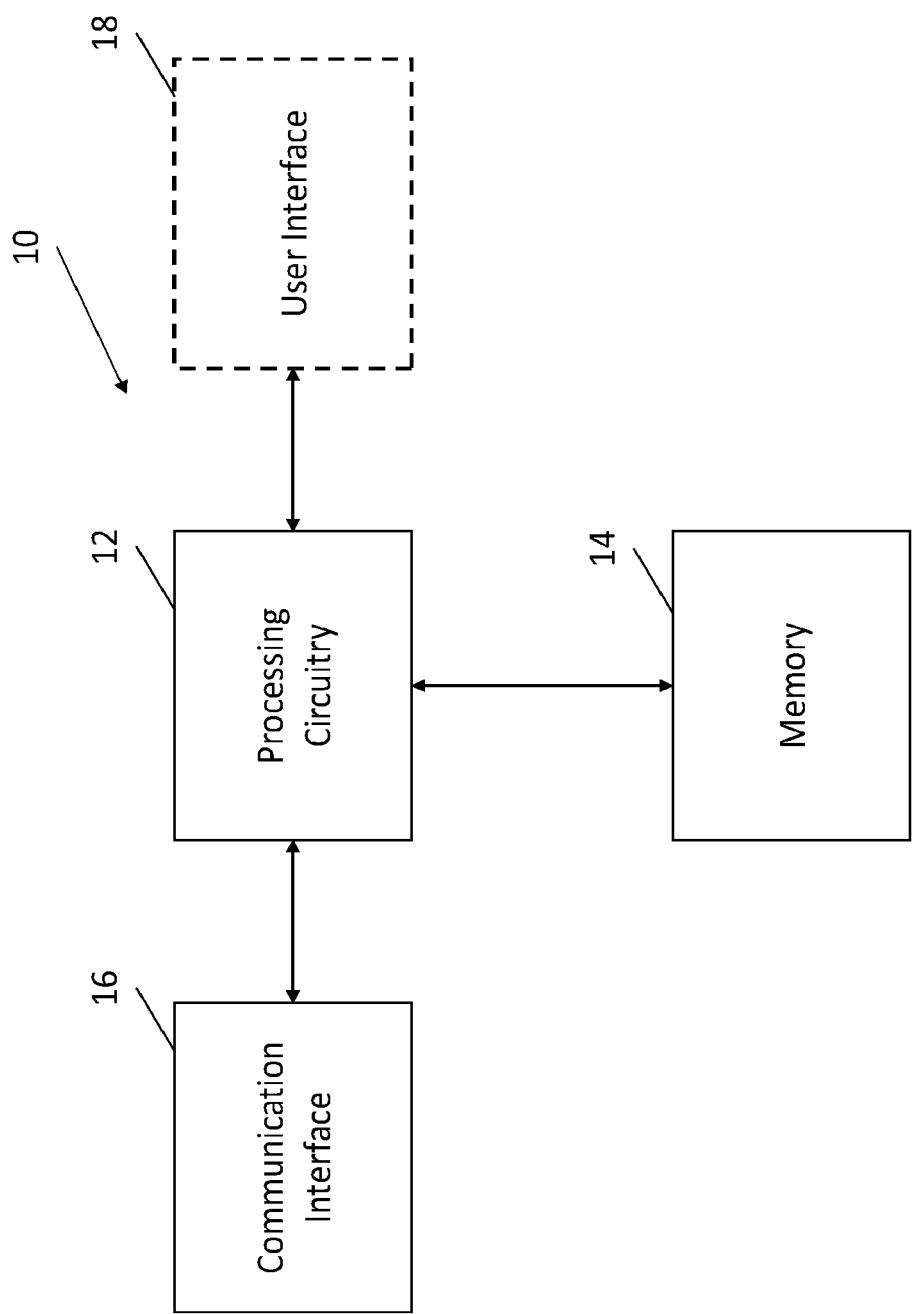
Figure 2:
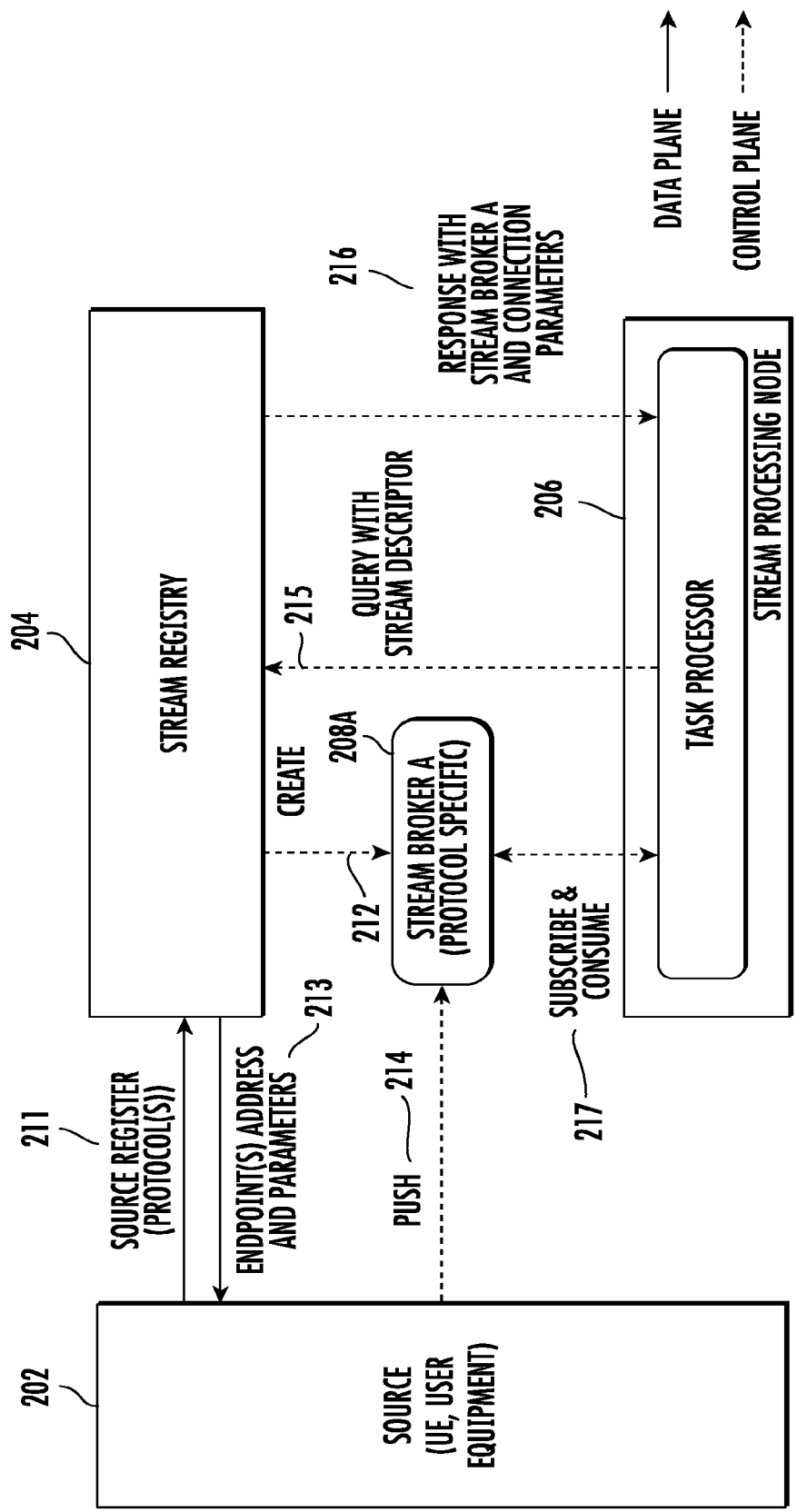
Figure 3:
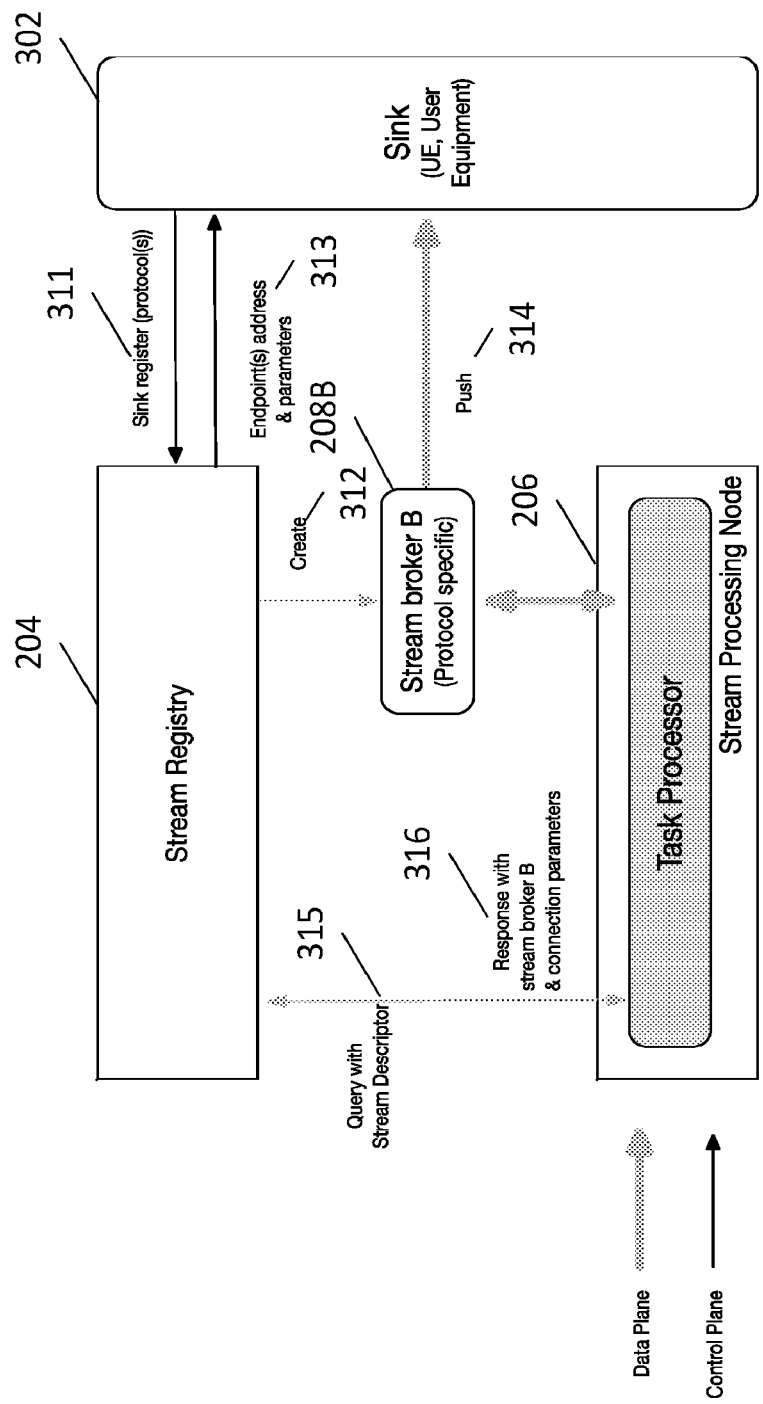
Figure 4:
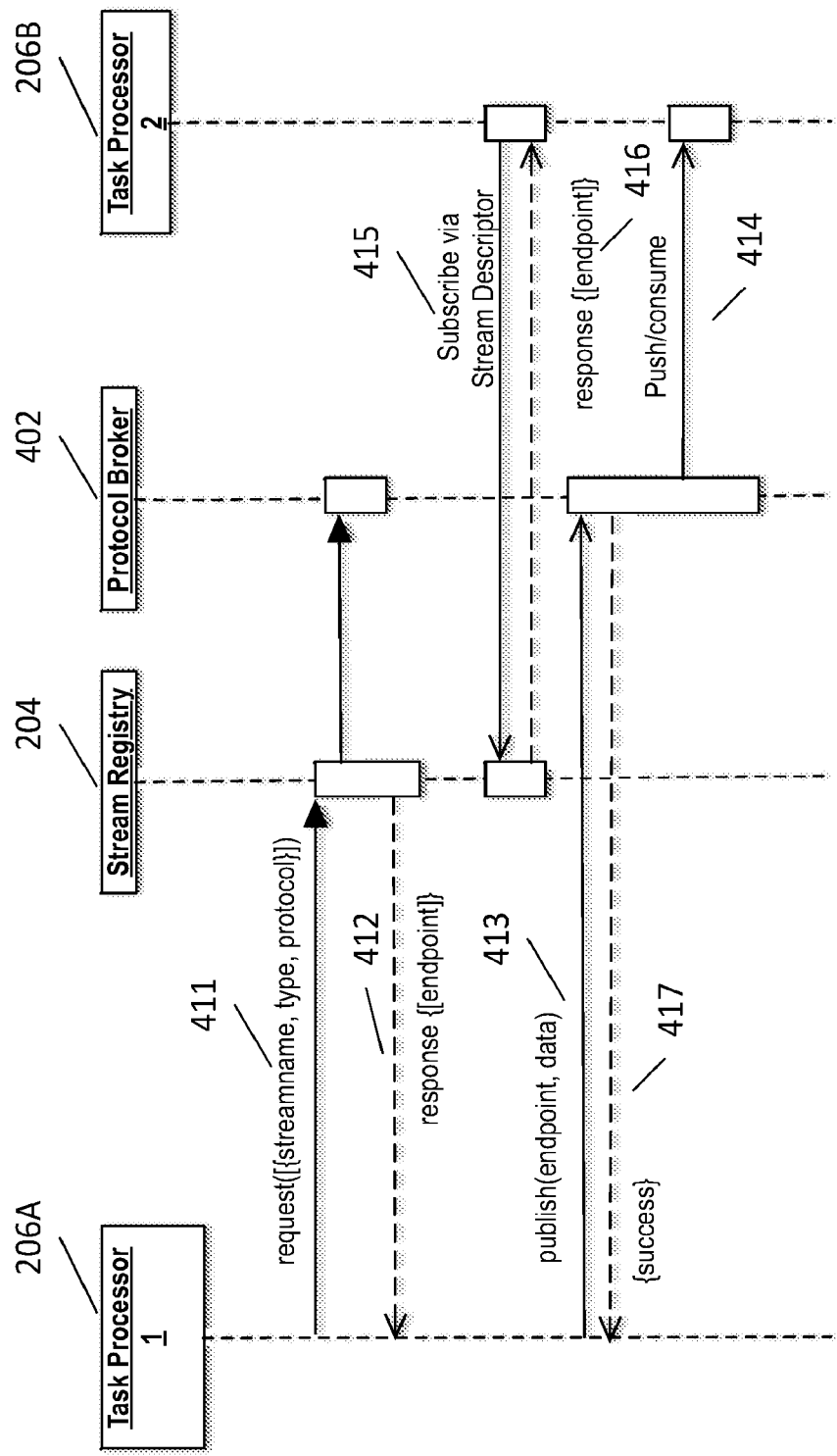
Figure 5:
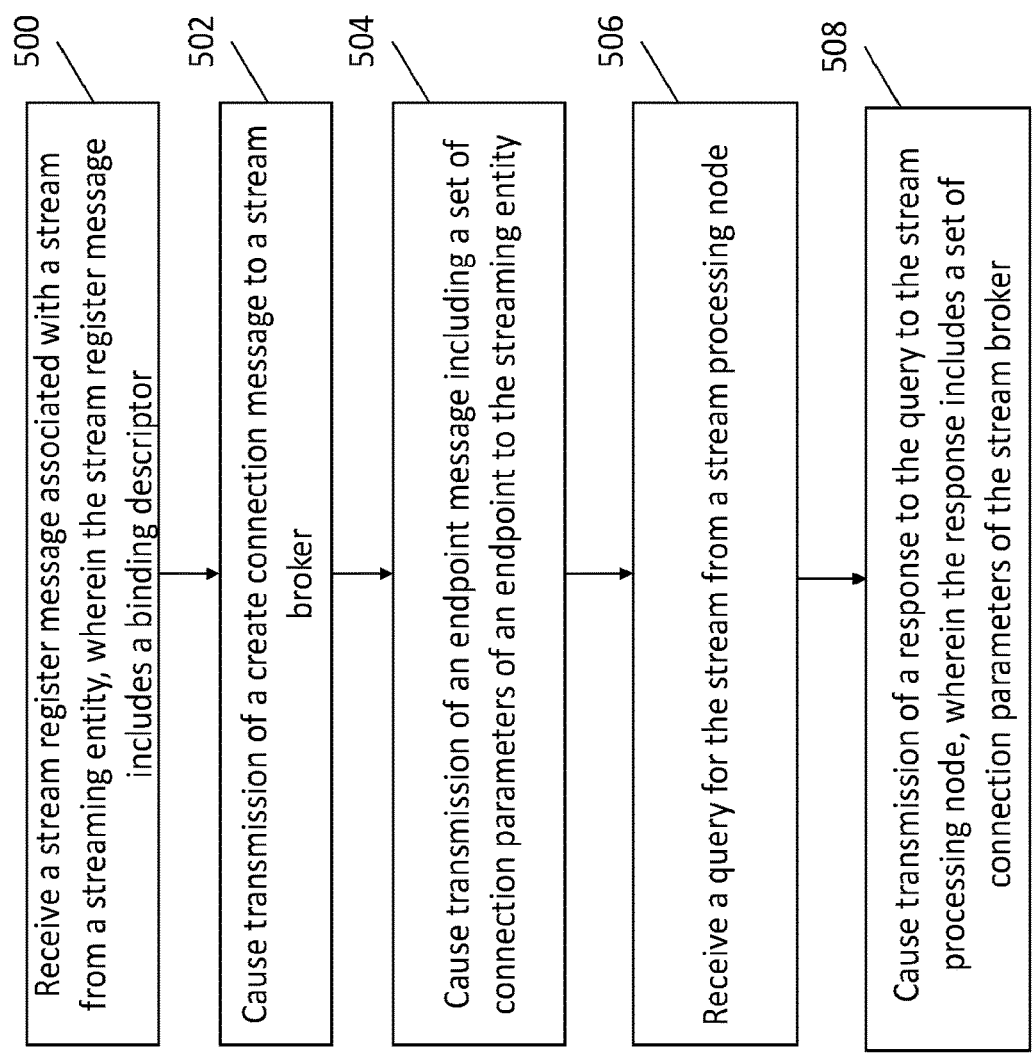
Figure 6:
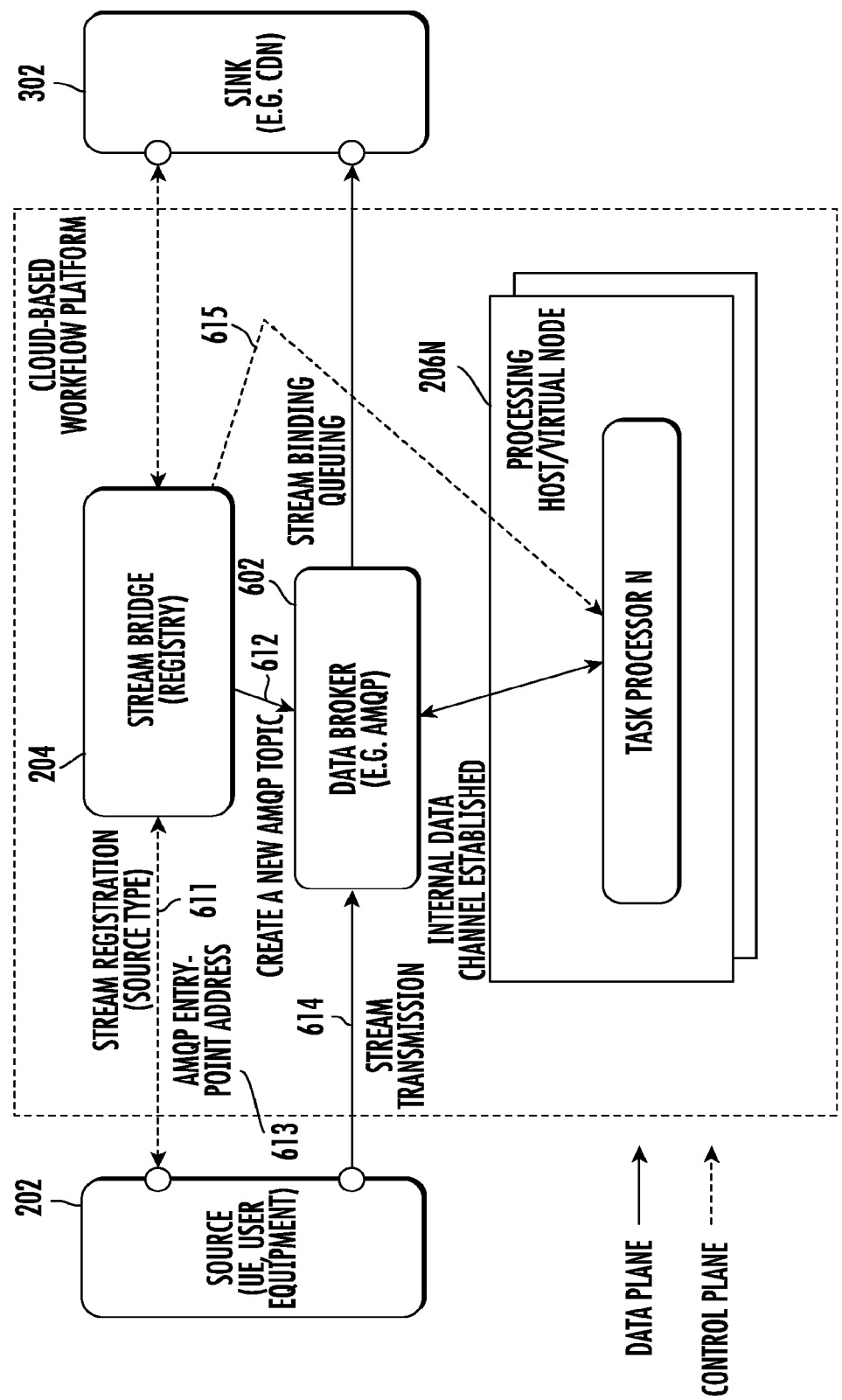

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 illustrates a stream binding flow for a source in a streaming environment in accordance with an example embodiment of the present disclosure;

FIG. 3 illustrates a stream binding flow for a sink in a streaming environment in accordance with another example embodiment of the present disclosure;

FIG. 4 illustrates a sequence diagram for internal/temporary stream bindings between multiple task processors in a cloud-based or distributed streaming environment in accordance with an example embodiment of the present disclosure;

FIG. 5 is a flowchart illustrating a set of operations performed, such as by the apparatus of FIG. 1, in accordance with an example embodiment of the present disclosure; and FIG. 6 illustrates a stream binding flow for a sink in a streaming environment in accordance with a further example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to provide a stream binding mechanism that supports stream data pulling and pushing in a distributed or cloud based streaming environment.

The method, apparatus and computer program product may be utilized in conjunction with a stream processing system utilizing various communication protocols such as Advanced Message Queuing Protocol (AMQP), Extensible Messaging and Presence Protocol (XMPP), or other messaging protocols used in a streaming environment.

The method, apparatus and computer program product may be utilized in conjunction with a binding descriptor specific in a declarative approach, for example, in Extensible Markup Language (XML), JSON or the like, or in scripting languages such as JavaScript or other scripting languages. An example embodiment is described in conjunction with TypeScript.

The method, apparatus and computer program product may be utilized in conjunction with a variety of media formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), MPEG-4 file format (ISO/IEC 14496-14, also known as the MP4 format).

FIG. 1 illustrates an example apparatus that may be provided to embody the various components in a cloud based or distributed streaming system, such as a source, a sink, a stream registry, a stream broker, and/or a task processor. As illustrated in FIG. 1, the apparatus 10 of an example embodiment includes, is associated with or is otherwise in communication with processing circuitry 12, a memory 14, a communication interface 16 and optionally, a user interface 18. Some components, such as a camera in a network data management protocol (NBMP) client, are not illustrated in FIG. 2.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is a user equipment that serves a sink or a source, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

FIG. 2 illustrates a stream binding flow for a source in a streaming environment in accordance with an example embodiment of the present disclosure. As illustrated in FIG. 2, the streaming environment includes a source 202, a stream registry 204, a task processor 206, and a stream broker 208A. The source 202 may be a user equipment, such as a mobile terminal, e.g., a smartphone, a computer, a camera, or the like, that is configured to provide stream data. The stream registry 204 is a management unit to keep track of both external and internal data and media steams. The stream registry 204 may may be embodied by an apparatus that include a memory to store the configurations and records of all registered streams for run-time querying (e.g., data look-up service), for example, by media processing functions. In addition, the registry may be embodied by an apparatus that include a processor configured to act as the data broker internally working in a publish-subscribe mode.

The task processor 206 is a stream processing node embodied by, for example, a processor and configured to process a streaming task. The stream broker 208A is a communication protocol specific broker embodied, for example, by a processor and configured to serve as a communication intermediary between the source 202, stream registry 204, and task processor 206.

As illustrated in FIG. 2, at 211, the source 202 is configured to send a source register message to the stream registry 204. In some embodiments, the source register message may include a binding descriptor of a stream to be provided or provided from the source 202 to the stream broker 208A.

A binding descriptor may be a parameter to the query function instances deployed with custom functions at run-time to the processing entities. The dynamic aspect of the querying function enables one or more of the following useful features: act as "external sensor" stream readers that provide continuous streams from external data publishers; act as "actuators" to the external data consumers (sinks); and/or act as "internal stream" providers that queue internal streams that can be used to compose complex workflows from the outputs of other running workflows.

The binding descriptor can be specified in a declarative approach, for example, in XML or JSON, or scripting language such as JavaScript. In the example illustrated below, TypeScript is used as an example. TypeScript supports the syntax of Union typing. A union type describes a value that can be one of several types. TypeScript uses the vertical bar (|) to separate each type, so number|string|boolean is the type of a value that can be a number, a string, or a boolean.

```
export interface BindIdDesc {
    bind: { id: string };
}
export interface BindNameDesc {
    bind: { name: string };
}
export interface BindTagDesc {
    bind: { tags: string[ ] };
}
export interface BindStreamTypeDesc {
    bind: { category: "Source" | "Sink" | "internalSource" |
    "internalSink" };
}
export interface BindStreamVersionDesc {
    bind: { version: number };
}
export interface BindStreamStatisticDesc {
    bind: { bandwidth: bandwidthType, throughput: throughputType };
}
export type BindingDesciptor = BindIdDesc | BindNameDesc |
BindTagDesc | BindStreamTypeDesc | BindStreamVersionDesc |
BindStreamStatisticDesc
```

BindIdDesc includes an identifier associated with the source.

BindNameDesc includes a name associated with the source 202 and the stream to be or previously provided by the source 202 to the stream broker 208A. BindTagDesc includes one or more tags associated with the source 202 and the stream to be or previously provided by the source 202 to the stream broker 208A. BindStreamTypeDesc includes a type description associated with the source 202 and the stream to be or previously provided by the source 202 to the stream broker 208A. BindStreamVersionDesc includes a version number associated with the source 202 and the stream to be or previously provided by the source 202 to the stream broker 208A. BindStreamStatisticDesc includes bandwidth statistics associated with the source 202 and the stream to be or previously provided by the source 202 to the stream broker 208A.

One example register message is provided below in semantics form:

```
/**
 * Query Source stream(s) with generic Stream type T
 *
 *
 * @param a binding descriptor object or array of binding descriptor
 objects
 */
export declare function source<T>(
    BindingDescriptor | BindingDescriptor[ ]): Stream<T>
```

At 212, the stream registry 204 is configured to send a create message to the stream broker 208A. The create message may be configured to create a connection between the stream broker 208A and the source 202. At 213, the stream registry 204 sends endpoint address and parameters to the source 202. In certain examples, an endpoint may be a physical computing node with a publicly accessible network address, and at least one transport protocol associated with one type of data transmission. The publicly accessible network addresses may include an internet protocol (IP) address or a uniform resource identifier (URI), and at least one transport protocol associated with one type of data transmission. Further, multiple endpoints may be synchronized and support a graceful start and tear down. In addition, the endpoints may have low latency requirements, and may be placed at locations close to users. The endpoints may also be server uniform resource locators (URLs) which may include parameters such as path or channel information. For instance, the parameters may be communication protocol-specific.

At 214, the source 202 pushes data, such as stream data, to the stream broker 208A. At 215 the task processor 206 is configured to send a query for the stream data to stream registry 204. The query may include a stream descriptor. At 216, the stream registry is configured to respond to the query with connection parameters of stream broker 208B. In some embodiments, the stream broker 208A may pull data from the source 202. In some embodiments, the source 202 is a remote web camera supporting a real time streaming protocol (RTSP). The task processor 206 may initialize a RTSP connection to the source 202 with connection parameters obtained. Accordingly, a RTSP channel may be established by the task processor to the source 206 for stream data transmission.

At 217, the task processor 206 is configured to subscribe to stream broker 208A using the connection parameters received. After the task processor 206 subscribes to the stream broker 208A, the stream broker 208A will transmit stream data to the task processor 206 and the task processor 206 may consume stream data provided by stream broker 208A in response. In some embodiments, the binding descriptor is transmitted with the stream data.

FIG. 3 illustrates a stream binding flow for a sink in a streaming environment in accordance with an example embodiment of the present disclosure. As illustrated in FIG. 3, the streaming environment includes a sink 302, a stream registry 204, a task processor 206, and a stream broker 208B. In some embodiments, the sink 302 may be a user equipment, such as a mobile terminal, e.g., a smartphone, a computer, a camera, or the like, that is configured to consume stream data. The stream registry 204 is a management unit that keeps tracks of both external and internal data and media steams. The stream registry 204 may be embodied by an apparatus that may include memory to store the configurations and records of all registered streams for run-time querying (e.g., data look-up service), for example, by media processing functions. In addition, the registry may be embodied by an apparatus that may include a processor configured to act as the data broker internally working in a publish-subscribe mode.

The task processor 206 is a stream processing node embodied, for example, by a processor and configured to process a streaming task. The stream broker 208B is a communication protocol specific broker embodied, for example, by a processor and configured to serve as a communication intermediary between the source 202, stream registry 204, and task processor 206.

As illustrated in FIG. 3, at 311, the sink 202 is configured to send a sink register message to the stream registry 204. In some embodiments, the source register message may include a binding descriptor of a stream to be provided or provided from the source 202 to the stream broker 208B. Similar to the binding descriptor for a source. The binding descriptor can be specified in a declarative approach, for example, in XML or JSON, or scripting language such as JavaScript. Parameters similar to binding descriptors for a source may be provided in the binding descriptor for a sink. The binding descriptor for a sink may also be referred as a routing descriptor.

At 312, the stream registry 204 is configured to send a create message to the stream broker 208B. The create message may be configured to create a connection between the stream broker 208B and the sink 302. At 313, the stream registry 204 sends an endpoint address and parameters to the sink 302. In certain examples, an endpoint may be a physical computing node with a publicly accessible network address, and at least one transport protocol associated with one type of data transmission. The publicly accessible network addresses may include an internet protocol (IP) address or a uniform resource identifier (URI), and at least one transport protocol associated with one type of data transmission. Further, multiple endpoints may be synchronized and support a graceful start and tear down. In addition, the endpoints may have low latency requirements, and may be placed at locations close to users. The endpoints may also be server uniform resource locators (URLs) which may include parameters such as path or channel information. For instance, the parameters may be communication protocol-specific.

At 314, the stream broker 208B pushes data, such as stream data, to the sink 302. In some embodiments, the sink 302 may pull the stream data. Stream broker 208B serves as a temporary caching solution for situations where the connection between the sink and the processing system is intermittent and less reliable. The sink 302 may consume the stream data.

At 315 the task processor 206 is configured to send a query for a sink of stream data to stream registry 204. At 316, the stream registry is configured to respond to the query with connection parameters of stream broker 208B. In some embodiments, the binding descriptor is transmitted with the response to the query.

Turning now to FIG. 4, a sequence diagram for internal/temporary stream bindings between multiple task processors in a cloud-based or distributed streaming environment in accordance with an example embodiment of the present disclosure is illustrated. As illustrated in FIG. 4, the streaming environment includes two task processors 206A and 206B, a stream registry 204, and a protocol broker 402. In some embodiments, the protocol broker 402 serves as an intermediary for the transmission of stream data.

As illustrated in 411, the task processor 206A transmits a stream data request to the stream registry 204. The stream data request may include a name of the stream, a type identifier associated with the stream, and a protocol associated with the stream. At 412, the stream registry 204 responds to the task processor with a endpoint. In some embodiments, the stream registry 204 transmits an indication of the stream data request to the protocol broker 402.

At 413, after receiving the endpoint information, the task processor 206A publishes endpoint information and stream data to the protocol broker 402. The protocol broker 402 may push the published stream data to the task processor 206B.

At 415, the task processor 206B subscribes to the stream registry using a stream descriptor. In some embodiments, the stream descriptor may include the binding descriptor previously described in conjunction with FIGS. 2 and 3. In some embodiments, element 415 occurs after element 414. In some other embodiments, element 415 occurs at any point between elements 411 and 414. In some other embodiments, element 415 occurs before element 411, therefore occurring before the temporary stream exists.

At 416, the stream registry 204 is configured to send a response 416 including endpoint information to the task processor 206B. At 417, the protocol broker 402 is configured to send a success indication message 417 to the task processor 206A.

Turning now to FIG. 5, the operations performed by the stream registry 204 in accordance with an example embodiment are illustrated. As shown in block 500, the stream registry 204 includes means, such as the communication interface 16 and/or the processing circuitry 12, for receiving a stream register message associated with a stream from a streaming entity, wherein the stream register message includes a binding descriptor. The streaming entity is either a source or a sink. The binding descriptor may be a binding descriptor previously described.

As shown in block 502, the stream registry 204 includes means, such as the communication interface 16 and/or the processing circuitry 12, for causing transmission of a create connection message to a stream broker. After receiving the create connection message, the stream broker may be configured to establish connection with the streaming entity. In some embodiments, if the streaming entity is a source, the stream broker may receive stream data from the source. In some embodiments, if the streaming entity is a sink, the stream broker may transmit streaming data to the sink.

As shown in block 504, the stream registry 204 includes means, such as the communication interface 16 and/or the processing circuitry 12, for causing transmission of an endpoint message including a set of connection parameters of an endpoint to the streaming entity. In certain examples, an endpoint may be a physical computing node with a publicly accessible network address, and at least one transport protocol associated with one type of data transmission. The publicly accessible network addresses may include an internet protocol (IP) address or a uniform resource identifier (URI), and at least one transport protocol associated with one type of data transmission. Further, multiple endpoints may be synchronized and support a graceful start and tear down. In addition, the endpoints may have low latency requirements, and may be placed at locations close to users. The endpoints may also be server uniform resource locators (URLs) which may include parameters such as path or channel information. For instance, the parameters may be communication protocol-specific.

As shown in block 506, the stream registry 204 includes means, such as the communication interface 16 and/or the processing circuitry 12, for receiving a query for the stream from a stream processing node.

As shown in block 508, the stream registry 204 includes means, such as the communication interface 16 and/or the processing circuitry 12, for causing transmission of a response to the query to the stream processing node, wherein the response includes a set of connection parameters of the stream broker. In some embodiments, the response also includes the binding descriptor.

In some embodiments, a stream-based workflow system may utilize the same stream binding mechanism using binding descriptors for workflow tasks. A workflow is a description or language that describes the chain of one or multiple data processing tasks as processors. Processors can run as one monolithic pattern, or in a distributed fashion, e.g., using a micro-service architecture. An example of the use of a binding descriptor can be illustrated as follows. All the bindings can be defined as named binding ports, where a workflow manager can connect them after such workflow is deployed into the workflow system. An example workflow with a binding descriptor embedded is provided below:

```
let workflow1 = {
  "bindings": {
    "source_bindings": {
      "binding_descriptor":[{ "tags": ["webcamera"]}, {"name": "camera" }],
      "named_binding": "camera_triggers"
    }
  },
  "processorA": {
    "function": "stitching",
    "ports":{
      "input": "camera_triggers",
      "output": "source_named_binding_here"
    }
  }
}
        A JSON schema is provided below to illustrate how such
binding descriptor may be normalized:
"stream_binding": {
    "type": "object",
    "description": "Binding parameters",
    "properties": {
        "named_binding": {
            "type": "string",
            "description": "named port linked to other workflow blocks"
        },
        "binding_descriptor": {
            "type": "object",
            "description": "binding descriptor, see the NBMP spec for
                details",
            "properties": {
                "name": {
                    "type": "string"
                },
                "tags": {
                    "type": "array",
                    "items": {
                        "type": "string"
                    }
                }
            }
        }
    }
},
"stream_bindings": {
    "type": "object",
    "description": "stream registry bindings for source and sink streams",
    "properties": {
        "registry_inputs": {
            "type": "object",
            "patternProperties": {
                "^.*$": {
                    "$ref": "#/definitions/stream_binding"
                }
            }
        },
        "registry_outputs": {
            "type": "object",
            "patternProperties": {
                "^.*$": {
                    "$ref": "#/definitions/stream_binding"
                }
            }
        }
    }
},
```

In some embodiments, the binding may be done dynamically at run-time. Dynamic or run-time binding is an extension to static binding that allows the bindings to be configured or parameterized and may be referred as "external binding".

When a workflow script is submitted to a workflow system, a separate bindings JSON configuration file can be provided along with the Workflow script or may be referenced in another manner. The bindings JSON configuration file specifies how each public source and sink would be bound, regardless of the default binding descriptor inlined in the original workflow description. This may be referred as "binding overriding". An example configuration file written in JSON is provided below:

```
{
    "named_binding_1": {
        "binding": binding_descriptor
    },
    "named_binding_2": {
        "binding": binding_descriptor
    }
}
```

When deploying a workflow description (e.g. a job in JavaScript), the client can submit the workflow job with a separate binding file (e.g. in JSON format). The job submission can be done over the network protocols such as hypertext transfer protocol (HTTP), or via a system client. For example, a command with the client named "xstream" is demonstrated as follows: xstream—bindings bindings.json script.js.

In another embodiment, the system can be implemented to support a "binding" storage, within which the binding descriptors can be persisted and managed with the same prioritization as workflow descriptions and steams in the stream-processing systems.

While specific implementations of a streaming environment have been provided above in conjunction with FIGS. 2 and 3, FIG. 6 illustrates a more generalized example streaming environment in accordance with an example embodiment. As illustrated in FIG. 6, the example streaming environment includes a source 202, a sink 302, a stream registry 204, one or more task processors 206N, and a data broker 602. At 611, the source 202 is configured to transmit a stream registration message to the stream registry 204. The stream registration message may indicate the source's preferred protocol to publish data.

After the stream registry 204 receives the stream registration message, the stream registry may register a stream associated with the stream registration message. In some embodiments, the stream registry 204 may build a cost function to determine a deployment of certain edge nodes and create one or more endpoints. At 612, the stream registry may transmit a create connection message to the data broker 602. In some embodiments, the create connection message includes an indication to create an AMQP topic if the data broker utilizes AMQP as a connection protocol. After the data broker 602 receives the create connection message 612, the data broker may return an acknowledgement message to the stream registry 204.

The stream registry 204 is configured to, at 613, transmit an entry point address to the source 202. The entry-point address may include an entry-point address of the data broker 602 that may be utilized by the source 202 to establish connection with the data broker 602.

At 614, after connection between the source 202 and the data broker 602 is established, the source 202 transmits stream data to the data broker 602. The data broker is configured to transmit the stream data received to the sink 302. In some embodiments, the data broker 602 may also establish an internal data channel with the task processors 206N to further process the stream data, such as further composing complex streaming workflows. At 615, the stream registry is configured to transmit a stream binding queuing message to the task processor 206N. The stream binding queuing message may be based on the stream binding flows described in conjunction with FIGS. 2 and 3.

A method, apparatus and computer program product therefore provide a stream binding mechanism that supports stream data pulling and pushing in a distributed or cloud based streaming environment. As a result of its implementation, the method, apparatus and computer program product of an example embodiment may support a distributed or cloud based streaming environment utilizing the stream binding mechanism in a manner that conserves computing resources of the system that processes the streams. In some embodiments, the method, apparatus and computer program product of an example embodiment may support a distributed or cloud based streaming environment utilizing the stream binding mechanism in a manner that is less dependent on the communication protocols and, as such, may be more portable.

As described above, FIG. 5 include flowchart of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 5. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
    receiving at a stream registry a stream register message associated with a stream from a streaming entity, wherein the stream register message includes a binding descriptor and a routing descriptor, wherein the binding descriptor is operable for querying one or more streams in instances in which the streaming entity comprises a source, and wherein the routing descriptor is operable for querying the one or more streams in an instance in which the streaming entity comprises a sink;
    causing transmission from the stream registry of a create connection message to a stream broker;
    causing transmission from the stream registry of an endpoint message including a set of connection parameters of an endpoint to the streaming entity;
    receiving at the stream registry a query for the stream from a stream processing node; and
    causing transmission from the stream registry of a response to the query to the stream processing node, wherein the response includes a set of connection parameters of the stream broker.

2. The method of claim 1, wherein the streaming entity comprises a source.

3. The method of claim 1, wherein the streaming entity comprises a sink.

4. The method of claim 1, wherein the stream broker is configured to establish connection with the streaming entity to transmit stream data.

5. The method of claim 1, wherein the stream broker is configured to establish connection with the streaming processing node to transmit stream data.

6. The method of claim 1, further comprising:
    creating, based at least upon said query for the stream received from the stream processing node and said stream register message, said response.

7. The method of claim 1, further comprising:
    creating the create connection message; and
    creating the endpoint message.

8. The method of claim 1, wherein one or more of the create connection message, the endpoint message, or the response to the query comprises the binding descriptor.

9. The method of claim 1, further comprising:
    in an instance in which the stream register message further comprises a binding configuration file, the binding configuration file comprising information for how a public source or a public sink is to be bound, causing the binding configuration file configured to override the binding descriptor.

10. An apparatus comprising at least one processor and at least one memory including computer program code for one or more programs, the at least one memory and the computer program code configured to, with the at least one processor, cause the apparatus at least to:
    receive at a stream registry a stream register message associated with a stream from a streaming entity, wherein the stream register message includes a binding descriptor and a routing descriptor, wherein the binding descriptor is operable for querying one or more streams in instances in which the streaming entity comprises a source, and wherein the routing descriptor is operable for querying the one or more streams in an instance in which the streaming entity comprises a sink;
    cause transmission from the stream registry of a create connection message to a stream broker;
    cause transmission from the stream registry of an endpoint message including a set of connection parameters of an endpoint to the streaming entity;
    receive at the stream registry a query for the stream from a stream processing node; and
    cause transmission from the stream registry of a response to the query to the stream processing node, wherein the response includes a set of connection parameters of the stream broker.

11. The apparatus of claim 10, wherein the streaming entity comprises a source.

12. The apparatus of claim 10, wherein the streaming entity comprises a sink.

13. The apparatus of claim 10, wherein the stream broker is configured to establish connection with the streaming entity to transmit stream data.

14. The apparatus of claim 10, wherein the stream broker is configured to establish connection with the streaming processing node to transmit stream data.

15. A computer program product comprises at least one non-transitory computer-readable storage medium having computer executable program code instructions stored therein, the computer executable program code instructions comprising program code instructions configured, upon execution, to:
    receive at a stream registry a stream register message associated with a stream from a streaming entity, wherein the stream register message includes a binding descriptor and a routing descriptor, wherein the binding descriptor is operable for querying one or more streams in instances in which the streaming entity comprises a source, and wherein the routing descriptor is operable for querying the one or more streams in an instance in which the streaming entity comprises a sink;
    cause transmission from the stream registry of a create connection message to a stream broker;
    cause transmission from the stream registry of an endpoint message including a set of connection parameters of an endpoint to the streaming entity;
    receive at the stream registry a query for the stream from a stream processing node; and
    cause transmission from the stream registry of a response to the query to the stream processing node, wherein the response includes a set of connection parameters of the stream broker.

16. The computer program product of claim 15, wherein the streaming entity comprises a source.

17. The computer program product of claim 16, wherein the streaming entity comprises a sink.

18. The computer program product of claim 15, wherein the stream broker is configured to establish connection with the streaming entity to transmit stream data.

19. The computer program product of claim 15, wherein the stream broker is configured to establish connection with the streaming processing node to transmit stream data.

* * * * *